(12) United States Patent
Kurokawa et al.

(10) Patent No.: US 11,323,635 B2
(45) Date of Patent: May 3, 2022

(54) IMAGING DEVICE INCLUDING DISTANCE CALCULATOR FOR SHIP AND SHIP INCLUDING THE IMAGING DEVICE

(71) Applicant: YAMAHA HATSUDOKI KABUSHIKI KAISHA, Iwata (JP)

(72) Inventors: Mitsuaki Kurokawa, Osaka (JP); Shimpei Fukumoto, Osaka (JP); Kohei Terada, Shizuoka (JP); Hirofumi Amma, Shizuoka (JP); Yoshimasa Kinoshita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/795,623

(22) Filed: Feb. 20, 2020

(65) Prior Publication Data
US 2020/0275036 A1 Aug. 27, 2020

(30) Foreign Application Priority Data

Feb. 25, 2019 (JP) .............................. JP2019-031998

(51) Int. Cl.
*H04N 5/265* (2006.01)
*H04N 7/18* (2006.01)
*B63B 49/00* (2006.01)
*H04N 5/247* (2006.01)

(52) U.S. Cl.
CPC ............. *H04N 5/265* (2013.01); *B63B 49/00* (2013.01); *H04N 5/247* (2013.01); *H04N 7/181* (2013.01); *B63B 2213/00* (2013.01)

(58) Field of Classification Search
CPC . G05D 1/0206; B60R 11/04; B60R 2300/107; B60R 2300/806; B60R 2300/808; B60R 2300/8086; B60R 2300/8093; G01S 3/782; G01S 13/937; G01B 11/00; H04N 13/204
See application file for complete search history.

(56) References Cited

U.S. PATENT DOCUMENTS

| | | | |
|---|---|---|---|
| 2010/0092042 A1* | 4/2010 | Asari | B60R 1/00 382/106 |
| 2012/0275022 A1* | 11/2012 | Oh | G01B 11/026 359/466 |
| 2016/0214534 A1* | 7/2016 | Richards | H04N 5/332 |
| 2017/0355307 A1* | 12/2017 | Ha | H04N 7/183 |

FOREIGN PATENT DOCUMENTS

| | | | |
|---|---|---|---|
| DE | 102014206677 A1 * | 10/2015 | G06T 7/593 |
| JP | 2005-180949 A | 7/2005 | |
| JP | 2005180949 A * | 7/2005 | |
| JP | 2010-93605 A | 4/2010 | |

* cited by examiner

*Primary Examiner* — Jayanti K Patel
*Assistant Examiner* — Christopher Kingsbury Glover
(74) *Attorney, Agent, or Firm* — Keating and Bennett, LLP (57) ABSTRACT

An imaging device that reduces differences between a bird's eye image and an actually measured distance includes imaging cameras mounted on a ship to capture peripheral images of the ship and combines the peripheral images captured by the imaging cameras to create the bird's eye image as a composite image. The imaging device includes an auxiliary camera adjacent to at least one of the imaging cameras, and a distance calculator that calculates a distance in a lateral direction using the auxiliary camera and the at least one of the imaging cameras adjacent to the auxiliary camera.

6 Claims, 9 Drawing Sheets

IMAGING DEVICE INCLUDING DISTANCE CALCULATOR FOR SHIP AND SHIP INCLUDING THE IMAGING DEVICE

CROSS REFERENCE TO RELATED APPLICATIONS

This application claims the benefit of priority to Japanese Patent Application No. 2019-031998 filed on Feb. 25, 2019. The entire contents of this application are hereby incorporated herein by reference.

BACKGROUND OF THE INVENTION

1. Field of the Invention

The present disclosure relates to an imaging device for a ship and a ship including the device.

2. Description of the Related Art

In order to assist the steering of a ship, creating a simulated bird's eye image of the ship as if viewed down from above is known. For example, Japanese Unexamined Patent Publication No. 2010-93605 discloses capturing peripheral images using a plurality of cameras located in the hull and combining the peripheral images to create a simulated bird's eye image as a composite image.

Japanese Unexamined Patent Publication No. 2005-180949 discloses, as another example of the technical idea utilizing a camera, arranging a pair of cameras at each of the front and back of a ship and allowing the pair to function as a stereo camera. According to this document, the distance between the ship and the mooring position, for example, is measurable.

The bird's eye image as described in Japanese Unexamined Patent Publication No. 2010-93605 can be used, for example, when mooring a ship. However, the exact distance to the mooring position is not obtained only from the simulated bird's eye image.

It is thus conceivable to use the stereo cameras according to Japanese Unexamined Patent Publication No. 2005-180949 in addition to the cameras described in Japanese Unexamined Patent Publication No. 2010-93605 in combination. In such a configuration, however, a difference may occur between the view obtained from the bird's eye image as the composite image and the distance actually measured by the stereo cameras since the cameras for creating the bird's eye image are different from the cameras for measuring the distance. This may cause disadvantages in the steering operation, such as mooring, of the ship.

SUMMARY OF THE INVENTION

Preferred embodiments of the present invention reduce differences between a view obtained from a composite image and an actually measured distance.

The present disclosure relates to imaging devices for ships each including a plurality of imaging cameras mounted on the ship to capture peripheral images of the ship and combining the peripheral images captured by the imaging cameras to create a composite image.

According to a first preferred embodiment of the present disclosure, an imaging device for a ship includes an auxiliary camera adjacent to at least one of a plurality of imaging cameras; and a distance calculator to calculate a distance in a predetermined direction using the auxiliary camera and the at least one of the imaging cameras adjacent to the auxiliary camera.

According to this configuration, the camera for distance measurement can be used as an imaging camera to create the composite image. This reduces the difference between the view obtained from the composite image and the actually measured distance.

According to a second preferred embodiment of the present disclosure, the imaging device may further include a display to display the composite image and a measurement result obtained by the distance calculator.

This configuration is advantageous in assisting the steering operation.

According to a third preferred embodiment of the present disclosure, the imaging cameras may include a front camera at a front of the ship, and a back camera at a back of the ship. The auxiliary camera may include a first auxiliary camera adjacent to the front camera in a longitudinal direction, and a second auxiliary camera adjacent to the back camera in the longitudinal direction.

This configuration is advantageous in assisting the steering operation.

According to a fourth preferred embodiment of the present disclosure, the first auxiliary camera may be located behind the front camera. The second auxiliary camera may be located in front of the back camera.

This configuration reduces the inclusion of the auxiliary cameras in the composite image.

According to an preferred embodiment of the present disclosure, the imaging cameras and the auxiliary cameras may be wide-angle cameras each including a wide-angle lens.

This configuration allows measurement of the distance without rotating the lens using a mechanical mechanism.

The present disclosure also relates to a ship including the imaging device according to the first to fifth preferred embodiments.

As described above, the imaging device reduces the difference between a bird's eye image and an actually measured distance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present disclosure will be described in detail below. The following description is a mere example.

An imaging device for a ship according to an preferred embodiment of the present disclosure is capable of confirming the peripheral circumstances of a ship using moving images in a steering operation, such as berthing, of the ship.

Figure 1:
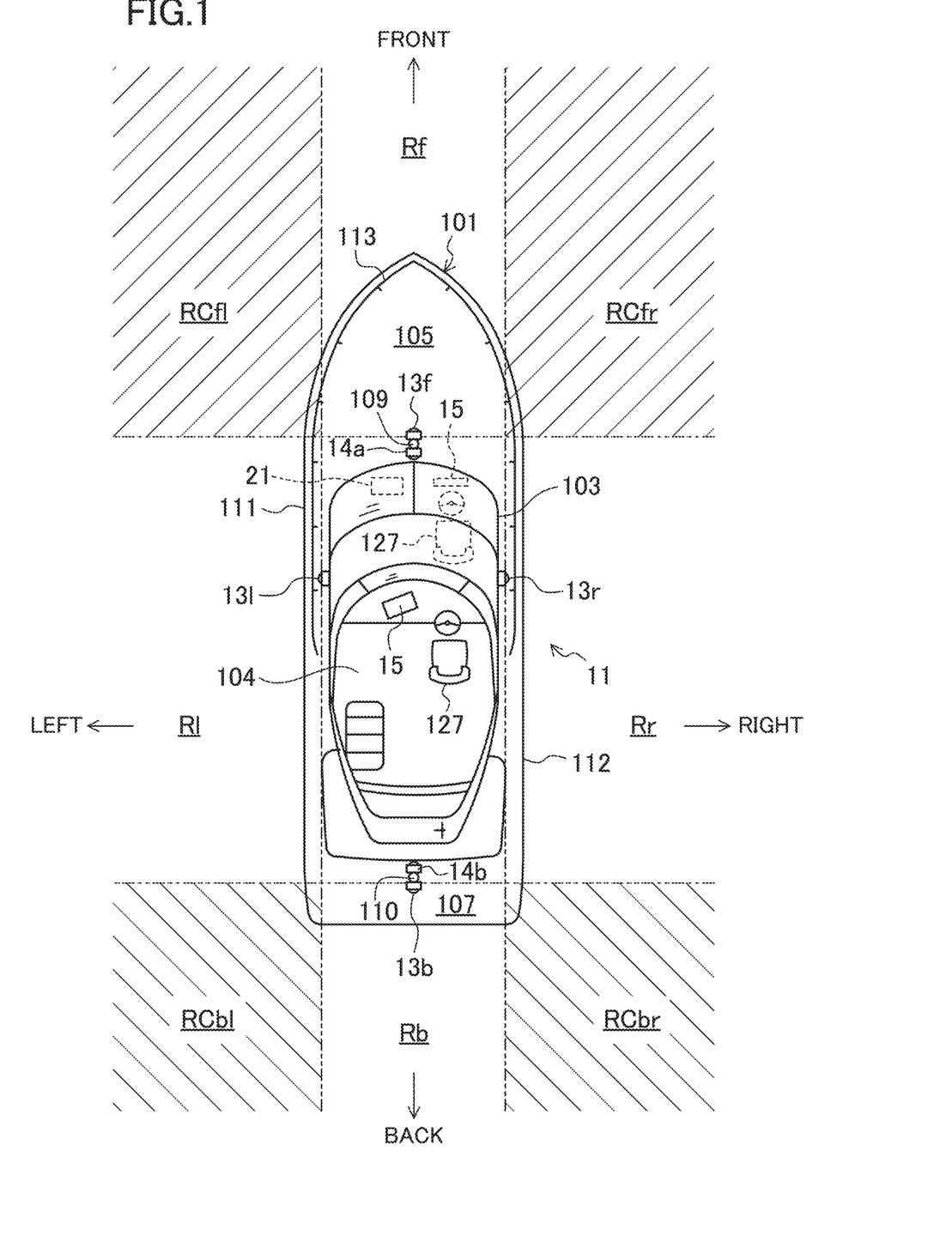
FIG. 1 is a plan view illustrating a ship equipped with an imaging device.
Figure 2:
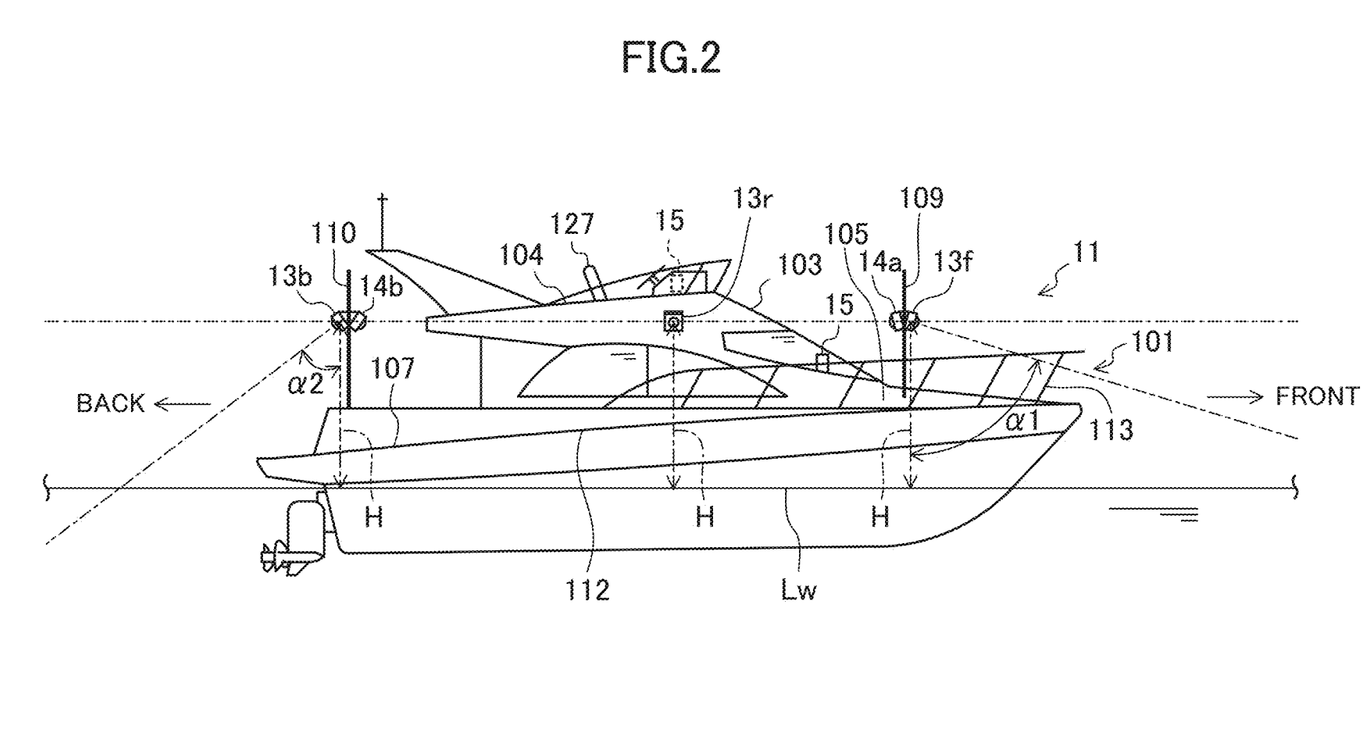
FIG. 2 is a side view illustrating the ship equipped with the imaging device.
Figure 3:
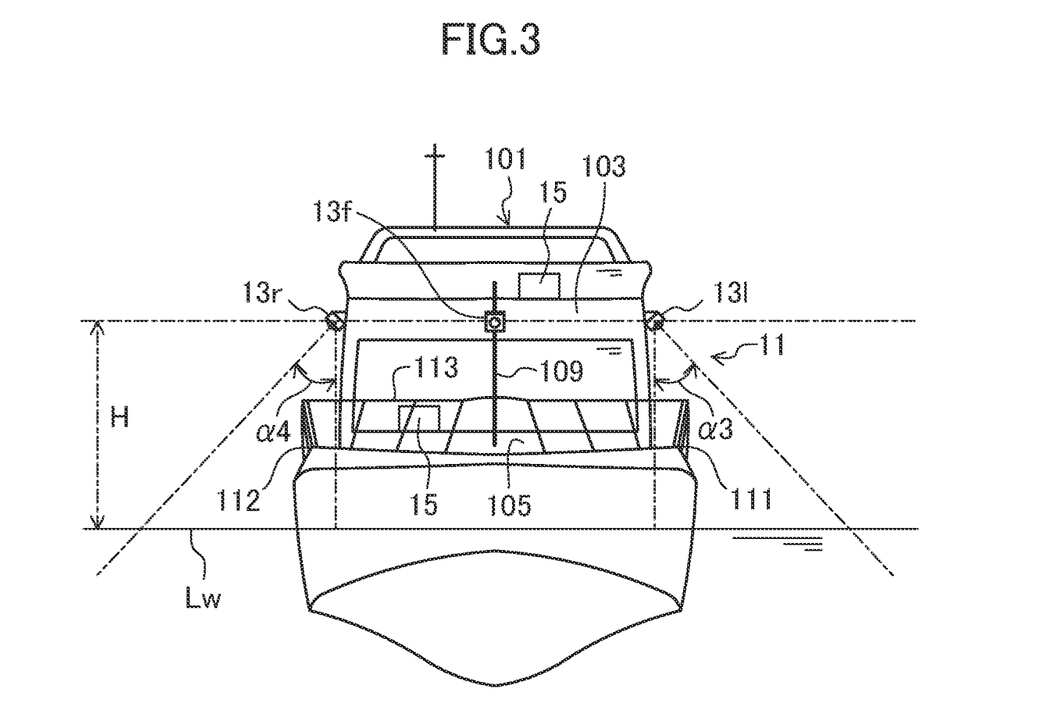
FIG. 3 is a front view illustrating the ship equipped with the imaging device.
Figure 4:
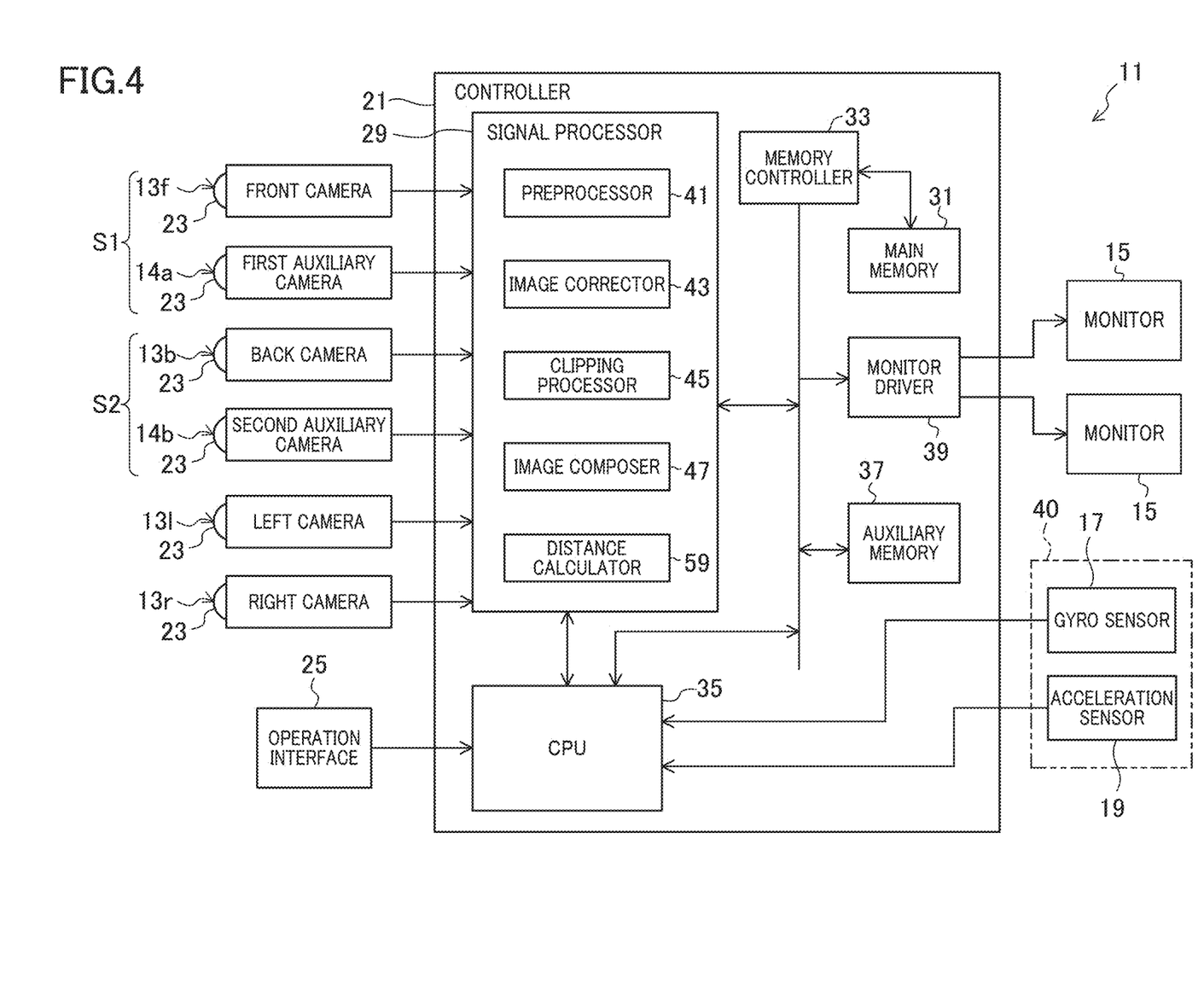
FIG. 4 is a block diagram illustrating a configuration of the imaging device.

A configuration of the imaging device for a ship will be described with reference to FIG. 1 to FIG. 4. FIG. 1 is a plan view illustrating a ship 101 equipped with an imaging device 11. FIG. 2 is a side view illustrating the ship 101 equipped with the imaging device 11. FIG. 3 is a front view illustrating the ship 101 equipped with the imaging device 11. FIG. 4 is a block diagram illustrating the configuration of the imaging device 11. FIG. 1 does not show exact postures of a plurality of cameras 13f, 13b, 131, and 13r included in the imaging device 11.

As shown in FIGS. 1 to 4, the imaging device 11 of the ship 101 includes the plurality of cameras 13f, 13b, 131, and 13r, monitors 15 as displays, various sensors 17 and 19, and a controller 21. The cameras 13f, 13b, 131, and 13r are located in the ship 101 at a predetermined interval. One of the monitors 15 is located in a cabin 103 and the other on a flying deck (flying bridge) 104. The sensors 17 and 19 detect the posture of the ship 101. The controller 21 comprehensively controls the device 11. The plurality of cameras 13f, 13b, 131, and 13r and the controller 21 capture peripheral images of the ship 101 and create a simulated bird's eye image 301 that is a composite image.

The cameras 13f, 13b, 131, and 13r are exemplary "imaging cameras" in this preferred embodiment as being included in the ship 101 and capable of capturing the peripheral images of the ship 101. Hereinafter, the cameras 13f, 13b, 131, and 13r may also be referred to as "imaging cameras."

The imaging device 11 according to this preferred embodiment connects the peripheral images captured by the respective imaging cameras 13f, 13b, 131, and 13r to create the composite image.

First, configurations of the imaging cameras 13f, 13b, 131, and 13r will be described in detail.

The imaging cameras 13f, 13b, 131 and 13r are as follows. The camera 13f is a front camera located at the front of the ship 101 (on a bow deck 105 at the bow in this preferred embodiment). The camera 13b is a back camera located at the back of the ship 101 (on a stern deck 107 at the stern in this preferred embodiment). The camera 131 is a left camera located on the left at the longitudinal center of the ship 101. The camera 13r is a right camera located on the right at the longitudinal center of the ship. These four imaging cameras 13f, 13b, 131 and 13r are located to capture images of the periphery, including the outer periphery, of the ship 101.

The front camera 13f is attached to a post 109 standing at the lateral center of the bow deck 105 to face obliquely downward and forward so that the optical axis of the lens is directed toward the bow (the outer periphery of the ship 101). This front camera 13f captures still or moving images of the view within a predetermined range Rf in front of the ship 101 and obtains a front image Pf as a peripheral image.

The back camera 13b is attached to a post 110 standing at the lateral center of the stern deck 107 to face obliquely downward and backward so that the optical axis of the lens is directed toward the stern (the outer periphery of the ship 101). This back camera 13b captures still or moving images of the view within a predetermined range Rb behind the ship 101 and obtains a back image Pb as a peripheral image.

The left camera 131 is attached on the left side surface of a cabin 103 to face obliquely left downward so that the optical axis of the lens is directed toward a left gunwale 111 (the outer periphery of the ship 101). This left camera 131 captures still or moving images of the view within a predetermined range R1 on the left of the ship 101 and obtains a left image Pl as a peripheral image.

The right camera 13r is attached on the right side surface of the cabin 103 to face obliquely right downward so that the optical axis of the lens is directed toward a right gunwale 112 (the outer periphery of the ship 101). This right camera 13r captures still or moving images of the view within a predetermined range Rr on the right of the ship 101 and obtains a right image Pr as a peripheral image.

The capturing range Rf of the front camera 13f and the capturing range R1 of the left camera 131 include a common overlapping capturing range RCfl (the shaded area on the upper left of the paper in FIG. 1). The front and left imaging cameras 13f and 131 are located at the positions and angles to capture the peripheral images Pf and Pl including, in common, the left of a handrail 113 located on the outer periphery of the bow deck 105 of the ship 101. Accordingly, the common capturing range RCfl between the front camera 13f and the left camera 131 is set to include the left of the handrail 113.

The capturing range Rf of the front camera 13f and the capturing range Rr of the right camera 13r include a common overlapping capturing range RCfr (the shaded area on the upper right of the paper in FIG. 1). The front and right imaging cameras 13f and 13r are located at the positions and angles to capture the peripheral images Pf and Pr including, in common, the right of the handrail 113 located on the outer periphery of the bow deck 105 of the ship 101. Accordingly, the common capturing range RCfr between the front camera 13f and the right camera 13r is set to include the right of the handrail 113.

The capturing range Rb of the back camera 13b and the capturing range R1 of the left camera 131 include a common overlapping capturing range RCbl (the shaded area on the lower left of the paper in FIG. 1). The back and left imaging cameras 13b and 131 are located at the positions and angles to capture the peripheral images Pb and Pl including, in common, the left of the stern deck 107 of the ship 101. Accordingly, the common capturing range RCbl between the back camera 13b and the left camera 131 is set to include the left of the stern deck 107.

The capturing range Rb of the back camera 13b and the capturing range Rr of the right camera 13r include a common overlapping capturing range RCbr (the shaded area on the lower right of the paper in FIG. 1). The back and right imaging cameras 13b and 13r are located at the positions and angles to capture the peripheral images Pb and Pr including, in common, the right of the stern deck 107 of the ship 101. Accordingly, the common capturing range RCbr between the back camera 13b and the right camera 13r is set to include the right of the stern deck 107.

In this preferred embodiment, the front camera 13f, the back camera 13b, the left camera 131, and the right camera 13r are positioned at the same height H from the water surface, which is the distance from a waterline Lw of the ship 101. The front camera 13f, the back camera 13b, and the left and right camera 131 and 13r are located at different angles α1, α2, and α3 and α4, respectively. The left camera 13l and the right camera 13r are located at the same angle, α3 and α4.

Each camera 13f, 13b, 13l, or 13r may be located at any angle. That is, the front camera 13f, the back camera 13b, the left camera 13l, and the right camera 13r may be located at the same angle α1, α2, α3, and α4. The left camera 13l and the right camera 13r may be located at different angles α3 and α4, respectively.

The imaging cameras 13f, 13b, 13l, and 13r are waterproof and dustproof. The imaging cameras 13f, 13b, 13l and 13r are detachably attached to the ship 101. For example, the cameras are attachable to the hull when the ship 101 is used, detachable after the use of the ship 101, and replaceable if any problem occurs.

The front camera 13f, the back camera 13b, the left camera 13l, and the right camera 13r are wide-angle cameras each including a wide-angle lens 23 with a wider angle of view than a standard lens. The wide-angle lens 23 may be, for example, a lens with an angle of view of 180 degrees or greater. Specifically, the front camera 13f, the back camera 13b, the left camera 13l, and the right camera 13r in this preferred embodiment are wide-area imaging cameras each including the wide-angle lens 23, that is, what is called "hemispheric cameras."

Figure 5:
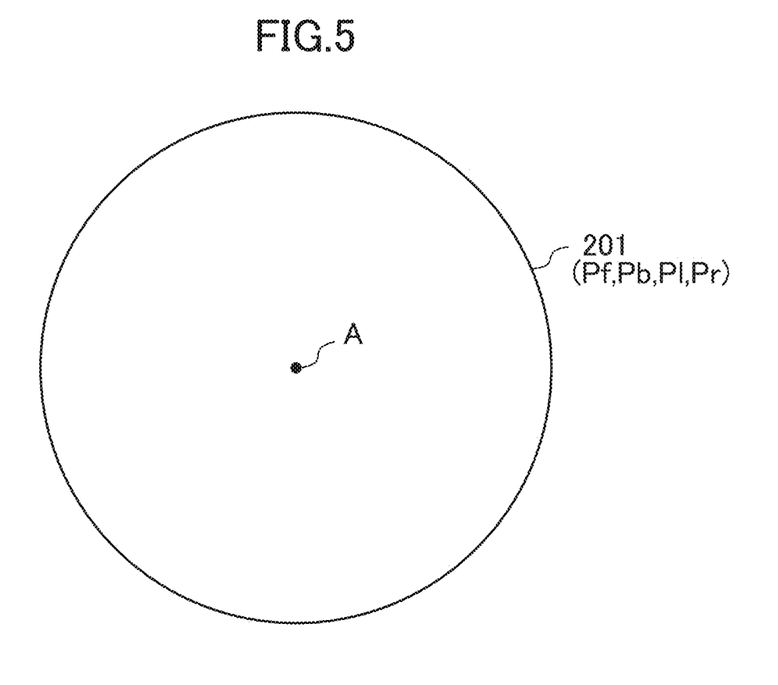
FIG. 5 is a schematic diagram illustrating an image captured by a hemispheric camera.

FIG. 5 is a conceptual diagram of an image 201 captured by a hemispheric camera. As shown in FIG. 5, each of the front image Pf captured by the front camera 13f, the back image Pb captured by the back camera 13b, the left image Pl captured by the left camera 13l, and the right image Pr captured by the right camera 13r is the circular image 201 with a view of 360 degrees around the optical axis A of the wide-angle lens 23. This circular image 201 corresponds to an image obtained by converting the stereoscopic optical image projected onto the outer surface of the wide-angle lens 23 into a planar image along the optical axis A.

The front image Pf, the back image Pb, the left image Pl, and the right image Pr, each of which is the circular image 201, include a wide-angle distortion. The "wide-angle distortion" is a distortion of a stereoscopic optical image deformed not similar to the field but shorter with a curve at a wider angle when the image is projected on a plane. This wide-angle distortion is one of aberrations of a lens and known as a barrel distortion of the wide-angle lens 23 that is not a fisheye lens. The degree of the distortion increases in accordance with a distance from the center of an image and is particularly significant around the image.

As illustrated in FIGS. 1 to 4, the imaging device 11 according to this preferred embodiment includes, in addition to the four imaging cameras 13f, 13b, 13l, and 13r, auxiliary cameras 14a and 14b adjacent to at least one of these imaging cameras 13f, 13b, 13l, and 13r.

Now, configurations of the auxiliary cameras 14a and 14b will be described in detail.

The auxiliary cameras 14a and 14b according to the present preferred embodiment are as follows. The first auxiliary camera 14a is adjacent to the front camera 13f in the longitudinal direction. The second auxiliary camera 14b is adjacent to the back camera 13b in the longitudinal direction.

Specifically, the first auxiliary camera 14a is attached to the post 109 standing on the bow deck 105 and located behind the front camera 13f. This first auxiliary camera 14a is aligned with the front camera 13f in the same longitudinal direction of the ship 101, and is located substantially at the same height as the front camera 13f in the vertical direction of the ship 101. The first auxiliary camera 14a is attached with the optical axis inclined obliquely downward, and captures still or moving images of the view within the predetermined range Rr and Rl respectively on the right and left of the ship 101 as a peripheral image.

The first auxiliary camera 14a is spaced apart from the front camera 13f at a known distance, which is stored in advance in various storage devices such as the auxiliary memory 37.

The second auxiliary camera 14b is attached to the post 110 standing on the stern deck 107 and located in front the back camera 13b. This second auxiliary camera 14b is aligned with the back camera 13b in the longitudinal direction of the ship 101, and is located substantially at the same height as the back camera 13b in the vertical direction of the ship 101. The second auxiliary camera 14b is attached with the optical axis inclined obliquely downward, and captures still or moving images of the view within the predetermined range Rr and Rl on the right and left of the ship 101 as a peripheral image like the first auxiliary camera 14a.

The second auxiliary camera 14b is spaced apart from the back camera 13b at a known distance, which is stored in advance in various storage devices such as the auxiliary memory 37.

In this preferred embodiment, the imaging cameras 13f, 13b, 13l, and 13r and the auxiliary cameras 14a and 14b are both wide-angle cameras each including the wide-angle lens 23.

That is, the auxiliary cameras 14a and 14b are wide-angle cameras each including the wide-angle lens 23 with a wider angle of view than a standard lens. Like the wide-angle lens 23 for the imaging cameras 13f, 13b, 13l, and 13r, the wide-angle lens 23 for the auxiliary cameras 14a and 14b may be, for example, a lens with an angle of view of 180 degrees or greater. Specifically, the first and second auxiliary cameras 14a and 14b in this preferred embodiment are wide-area cameras each including the wide-angle lens 23, that is, what is called "hemispheric cameras." The focal position of the first auxiliary camera 14a is identical or substantially identical to the focal position of the front camera 13f, whereas the focal position of the second auxiliary camera 14b is identical or substantially identical to the focal position of the back camera 13b.

Figure 7:
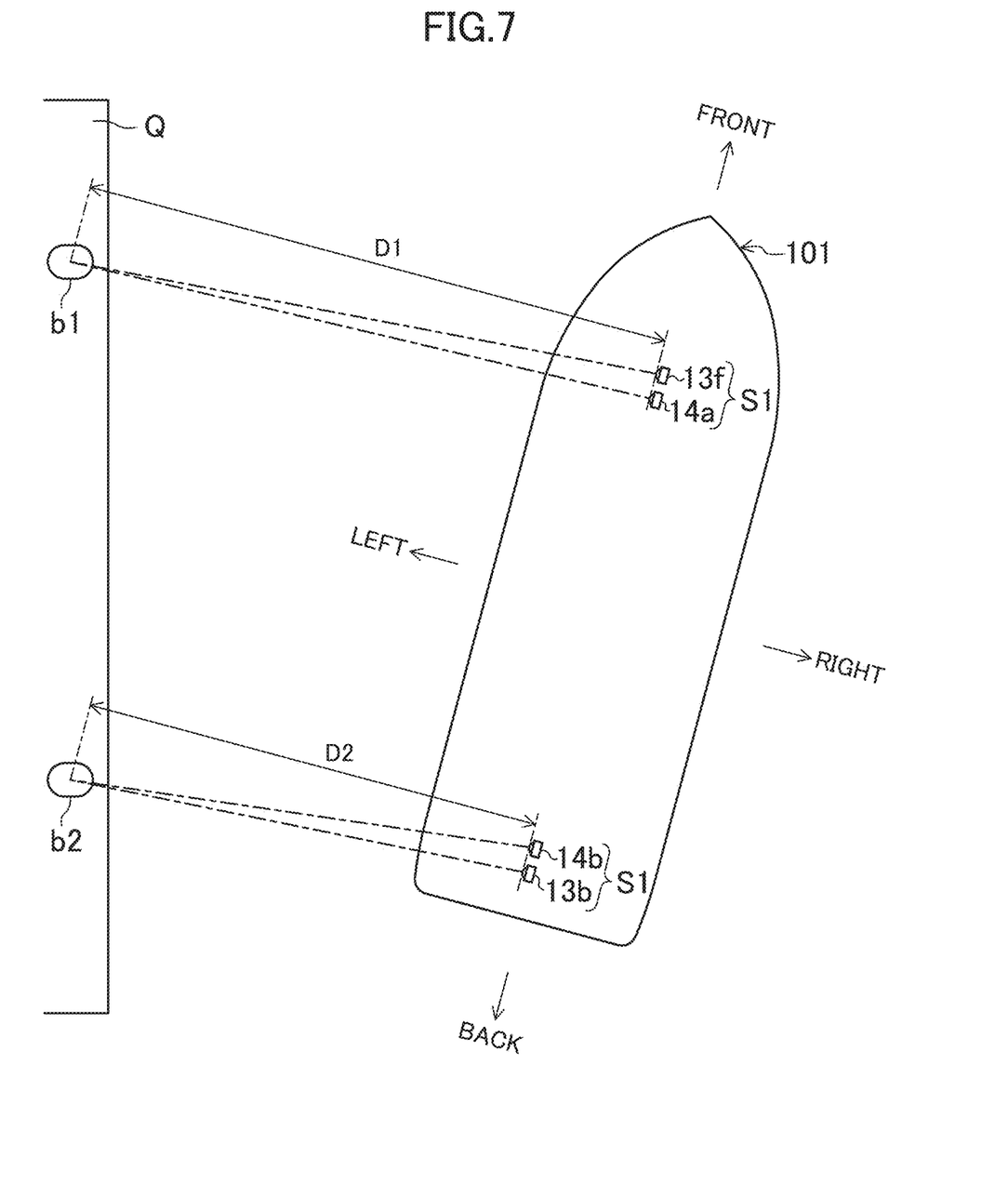
FIG. 7 is a diagram illustrating distance measurement using the imaging device.

As illustrated in FIG. 7, the imaging device 11 according to this preferred embodiment allows the first auxiliary camera 14a and the front camera 13f to function as a first stereo camera S1 capable of measuring a distance D1 in the lateral (predetermined) direction.

The imaging device 11 according to this preferred embodiment also allows the second auxiliary camera 14b and the back camera 13b to function as a second stereo camera S2 capable of measuring a distance D2 in the lateral (predetermined) direction.

Specifically, a distance calculator 59, which serves as the controller 21 of the imaging device 11, is configured to measure or calculate the distances D1 and D2, respectively, through the first or second stereo cameras S1 and S2. The result of calculation or measurement by the distance calculator 59 may be displayed by the monitors 15 together with the bird's eye image 301 as the composite image.

Now, configurations of the monitors 15 will be described in detail.

One of the monitors 15 is disposed in front of a steering seat 127 in the cabin 103 and the other around a steering seat 127 in the flying deck (flying bridge) 104, to be seen by a ship operator seated on the steering seat 127 while steering the ship. Each monitor 15 displays the simulated bird's eye image of the ship 101 as if viewed down from above. The image is created based on the front image Pf, the back image Pb, the left image Pl, and the right image Pr obtained by the front camera 13*f*, the back camera 13*b*, the left camera 13*l*, and the right camera 13*r*.

Figure 6:
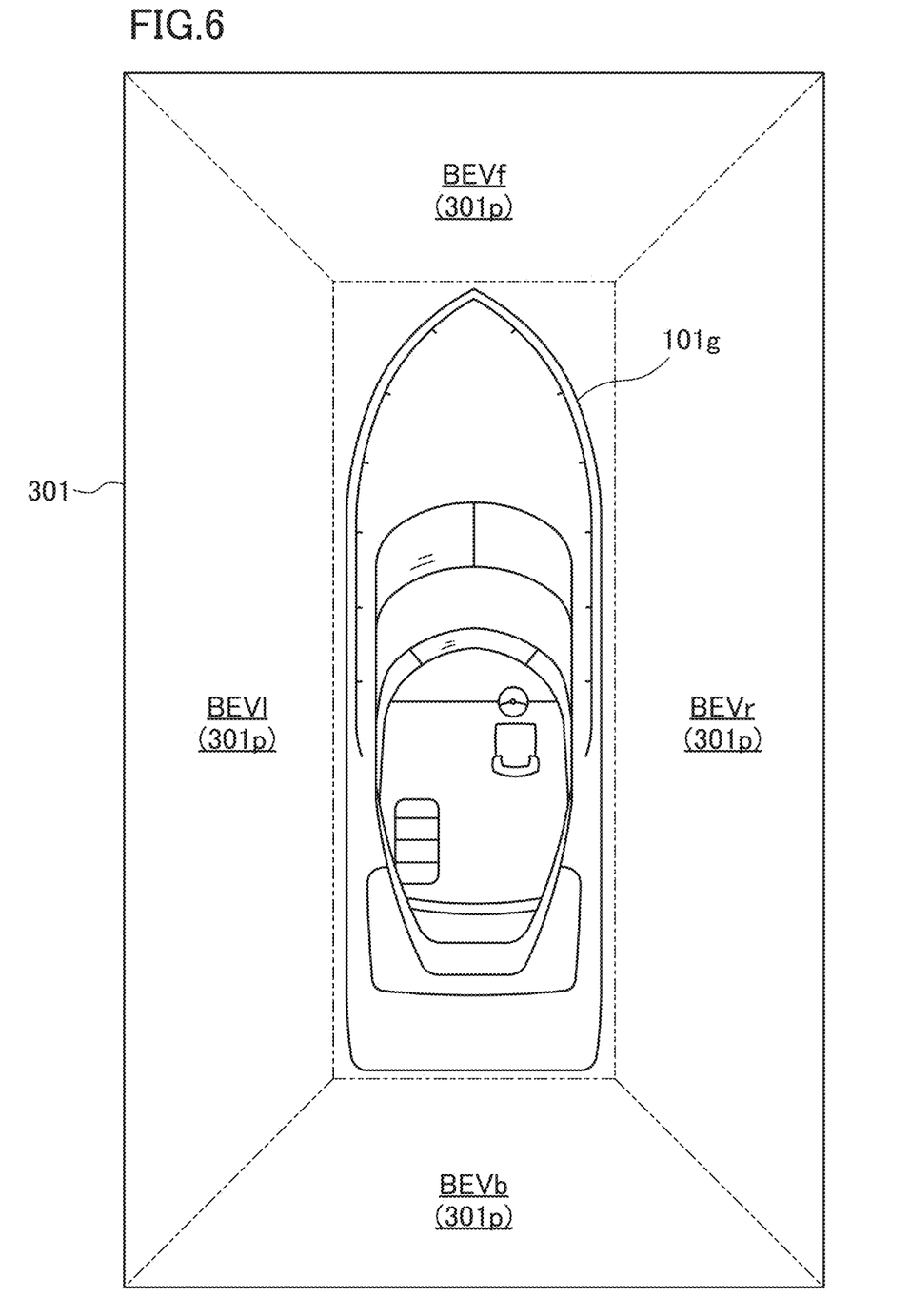
FIG. 6 is a schematic diagram illustrating a bird's eye image displayed by monitors.

FIG. 6 is a schematic diagram of the bird's eye image 301 displayed by the monitors 15. As shown in FIG. 6, the bird's eye image 301 is integrated by seamlessly connecting four partial bird's eye images 301*p*, namely, a front bird's eye image BEVf, a back bird's eye image BEVb, a left bird's eye image BEVl, and a right bird's eye image BEVr, in the common capturing ranges RCfl, RCfr, RCbl and RCbr, or aligned and displayed as separate data. In this bird's eye image 301, a ship image 101*g* representing the upper surface of the ship 101 is shown at the center. The ship image 101*g* may be an illustration or a photograph, for example.

Each monitor 15 may be, for example, a liquid crystal display panel functioning as a touch panel. Each monitor 15 also defines and functions as an operation interface 25. The operation interface 25 sends an instruction on display setting such as switch between the ranges of the bird's eye image 301 to be displayed, or display of the individual peripheral images (i.e., the front image Pf, the back image Pb, the left image Pl, and the right image Pr) instead of the bird's eye image 301. Each monitor 15 also displays a menu screen used for such an instruction. The ship operator executes various processing by operating the operation interface 25 in accordance with the menu screen.

As will be described later, the monitors 15 as the displays allow simultaneous display of the bird's eye view image 301 as the composite image and the measurement results D1 and D2 obtained by the distance calculator 59 (see FIG. 8). Such processing is executed based on a control signal from the controller 21.

Now, a configuration of the control system of the imaging device 11 will be described in detail.

The various sensors 17 and 19 may include a gyro sensor 17 and an acceleration sensor 19. The gyro sensor 17 and the acceleration sensor 19 define a tilt sensor 40 that detects the tilts of the front camera 13*f*, the back camera 13*b*, the left camera 13*l*, and the right camera 13*r* changing in accordance with the shaking of the ship 101.

The gyro sensor 17 detects how fast the front camera 13*f*, the back camera 13*b*, the left camera 13*l*, and the right camera 13*r* rotate when the ship 13 is tilted. The acceleration sensor 19 detects to which orientations the front camera 13*f*, the back camera 13*b*, the left camera 13*l*, and the right camera 13*r* rotate when the ship 13 is tilted.

The gyro sensor 17 and the acceleration sensor 19 are built in at least one of the front camera 13*f*, the back camera 13*b*, the left camera 13*l*, the right camera 13*r*, and the controller 21, for example. The gyro sensor 17 and the acceleration sensor 19 may be located in the ship 101 separately from the cameras 13*f*, 13*b*, 13*l*, and 13*r* and the controller 21.

The controller 21 is a controller implemented by a known microcomputer. This controller 21 is located in the cabin 103, for example, and distributes and supplies power to the front camera 13*f*, the back camera 13*b*, the left camera 13*l*, the right camera 13*r*, and the monitors 15, for example, upon receipt of power supply from the battery of the ship 101. The controller 21 exchanges data with the imaging cameras 13*f*, 13*b*, 13*l*, and 13*r*, the monitors 15, and the various sensors 17 and 19.

Specifically, as shown in FIG. 4, the controller 21 includes a signal processor 29, a main memory 31, a memory controller 33, a central processor (CPU) 35, an auxiliary memory 37, and a monitor driver 39. The signal processor 29 performs predetermined processing of image data. The main memory 31 temporarily stores programs and data. The memory controller 33 controls writing and reading of the programs and data to and from the main memory 31. The CPU 35 executes the programs read out of the main memory 31. The auxiliary memory 37 stores various programs and data. The monitor driver 39 operates the monitors 15.

The signal processor 29 and the CPU 35 may typically be integrated circuits (ICs), for example, large-scale integrated circuits (LSICs) and application specific integration circuits (ASICs). The main memory 31 may typically be a volatile memory such as a dynamic random-access memory (DRAM) or a synchronous DRAM (SDRAM). The auxiliary memory 37 may typically be a non-volatile memory such as a flash memory.

The signal processor 29 sequentially obtains the image data on the frames of the front image Pf, the back image Pb, the left image Pl, and the right image Pr output from the front camera 13*f*, the back camera 13*b*, the left camera 13*l*, and the right camera 13*r*, respectively. The signal processor 29 creates four partial bird's eye images 301*p* based on the image data on the obtained peripheral images Pf, Pb, Pl and Pr and connects the four partial bird's eye images 301*p* (i.e., BEVf, BEVb, BEVl, and BEVr) to compose and create the single bird's eye image 301.

The auxiliary memory 37 stores external parameters and internal parameters of the front camera 13*f*, the back camera 13*b*, the left camera 13*l*, the right camera 13*r*, the first auxiliary camera 14*a*, and the second auxiliary camera 14*b*. The "external parameters" are here numerical values indicating the placement, such as the positions and angles, of the cameras. The "internal parameters" are numerical values indicating the optical characteristics specific to the cameras, such as information on the positions of the optical axes, the focal lengths, and the distortions such as wide-angle distortions of the cameras.

The auxiliary memory 37 also stores setting values (initial values before calibration processing) for the positions in which the front and left images Pf and Pl, the back and left images Pb and Pl, the front and right images Pf and Pr, and the back and right images Pb and Pr are combined.

The positions in which the front image Pf and the right and left images Pr and Pl are combined indicate the area to be clipped for the bird's eye image 301, that is, the area for the front bird's eye image BEVf. The positions in which the back image Pb and the right and left images Pr and Pl are combined indicate the area to be clipped for the bird's eye image 301, that is, the area for the back bird's eye image BEVb. The positions in which the left image Pl and the front and back images Pf and Pb are combined indicate the area to be clipped for the bird's eye image 301, that is, the area for the left bird's eye image BEVl. The positions in which the right image Pr and the front and back images Pf and Pb are combined indicate the area to be clipped for the bird's eye image 301, that is, the area for the right bird's eye image BEVr.

The signal processor 29 is configured or programmed to include a preprocessor 41, an image corrector 43, a clipping processor 45, and an image composer 47. The preprocessor 41, the image corrector 43, the clipping processor 45, and the image composer 47 are functional elements achieved by cooperation between hardware such as a microcomputer and software such as programs to be executed on the hardware.

The memory controller 33 reads out the image data on the front image Pf, the back image Pb, the left image Pl, and the right image Pr from the main memory 31 when performing predetermined processing on the image data at the preprocessor 41, the image corrector 43, the clipping processor 45, and the image composer 47. After performing the predetermined processing on the image data on the front image Pf, the back image Pb, the left image Pl, and the right image Pr, the memory controller 33 writes the image data into the main memory 31.

The preprocessor 41 performs, as preprocessing, adjustment processing such as digital clamping, pixel defect correction, and gain control on the image data on the front image Pf, the back image Pb, the left image Pl, and the right image Pr captured by the front camera 13f, the back camera 13b, the left camera 13l, and the right camera 13r, respectively.

The image corrector 43 reads out the internal and external parameters of the front camera 13f, the back camera 13b, the left camera 13l, and the right camera 13r stored in the auxiliary memory 37 through the memory controller 33 to the main memory 31.

The image corrector 43 then performs distortion correction to convert the image data on the front image Pf into an image free from distortions, such as a wide-angle distortion, based on the internal parameters of the front camera 13f. The image corrector 43 performs the same or similar distortion correction of the image data on the back image Pb based on the internal parameters of the back camera 13b. The image corrector 43 performs the same or similar distortion correction of the image data on the left image Pl based on the internal parameters of the left camera 13l. The image corrector 43 performs the same or similar distortion correction of the image data on the right image Pr based on the internal parameters of the right camera 13r.

In addition, the image corrector 43 performs viewpoint conversion processing to convert the image data on the front image Pf into an image as if viewed down from above based on the internal and external parameters of the front camera 13f. The image corrector 43 performs the same or similar viewpoint conversion processing on the image data on the back image Pb based on the internal and external parameters of the back camera 13b. The image corrector 43 performs the same or similar viewpoint conversion processing on the image data on the left image Pl based on the internal and external parameters of the left camera 13l. The image corrector 43 performs the same or similar viewpoint conversion processing on the image data on the right image Pr based on the internal and external parameters of the right camera 13r.

The clipping processor 45 reads out setting values stored in the auxiliary memory 37 through the memory controller 33 to the main memory 31. The setting values relate to the positions in which the front and left images Pf and Pl, the back and left images Pb and Pl, the front and right images Pf and Pr, and the back and right images Pb and Pr are combined. The clipping processor 45 partially clips the image data on the front image Pf, the back image Pb, the left image Pl, and the right image Pr after the distortion correction and viewpoint conversion processing described above in accordance with the setting values for the positions in which the peripheral images Pf, Pb, Pl, and Pr are combined. Accordingly, the clipping processor 45 creates the partial bird's eye image data on the front bird's eye image BEVf, the back bird's eye image BEVb, the left bird's eye image BEVl, and the right bird's eye image BEVr.

When performing the clipping processing of such image data, the signal processor 29 corrects the tilts of the front image Pf, the back image Pb, the left image Pl, and the right image Pr and the clipping positions of the bird's eye images 301p (i.e., the front bird's eye image BEVf, the back bird's eye image BEVb, the left bird's eye image BEVl, and the right bird's eye image BEVr) based on the tilts of the front camera 13f, the back camera 13b, the left camera 13l, and the right camera 13r detected by the tilt sensor 40. Such correction is called "electronic gimbaling," a technique of canceling the displacement of a captured image in the rotation direction caused by a dynamic change in the posture of a camera.

The partial bird's eye images 301p are tilted with a change in the orientations of the cameras 13f, 13b, 13l, 13r caused by the shaking of the hull due to waves. Such tilts of the partial bird's eye images 301p seem larger with an increasing distance of the bird's eye images 301p from the hull, since the viewpoint conversion processing described above is performed. In contrast, in the present preferred embodiment, as described above, since the electronic gimbaling is performed to create the bird's eye image 301, the tilts of the bird's eye images 301p are corrected in accordance with the degrees of tilts of the front camera 13f, the back camera 13b, the left camera 13l, and the right camera 13r according to the posture of the ship 101, even when the ship 101 shakes and tilts. This reduces the tilts of the partial bird's eye images 301p caused by the shaking of the hull due to waves. This is advantageous in reducing the shaking of the bird's eye image 301 when the image 301 is displayed in real time. The partial bird's eye image data created in this manner is stored in the main memory 31 by the memory controller 33.

The image composer 47 allows the memory controller 33 to read out, frame by frame, the partial bird's eye image data on the four images, the front bird's eye image BEVf, the back bird's eye image BEVb, the left bird's eye image BEVl, and the right bird's eye image BEVr written in the main memory 31. The image composer 47 then combines the read-out partial bird's eye images and adjusts the image data on the ship image 101g to be positioned at the center of the image. This allows for creation of the bird's eye image data on the bird's eye image 301 by combining the front, back, left, and right images Pf, Pb, Pl, and Pr after the various correction and conversion processing. The bird's eye image data created in this manner is stored in the main memory 31 by the memory controller 33.

The bird's eye image data of each frame written in the main memory 31 is read by the memory controller 33 upon receipt of an instruction from the CPU 35 and transferred to the monitor driver 39. The monitor driver 39 drives the monitors 15 based on the bird's eye image data read out of the main memory 31. Accordingly, the monitors 15 display, as a real-time image (i.e., a live view), the bird's eye image 301 based on the bird's eye image data.

In addition to the creation of the bird's eye image 301, the controller 21 also functions to measure the distances D1 and D2 respectively through the first and second stereo cameras S1 and S2. Specifically, the controller 21 includes a distance calculator 59 that measures a distance in a predetermined direction using the first or second stereo cameras S1 and S2. The distance calculator 59 is an exemplary "distance calculator" that measures or calculates a distance.

Specifically, the distance calculator 59 according to this preferred embodiment calculates or measures the lateral distance as the predetermined direction using the first stereo camera S1. More specifically, as shown in FIG. 7, the distance calculator 59 allows calculation or measurement of the distance D1 from the front of the ship 101 (specifically, the position in which the first stereo camera S1 is located) to the subject that can be captured by the first stereo camera S1. In the example shown in FIG. 7, a bit b1 located on a quay Q is illustrated as the subject. Hereinafter, the bit b1 as the subject of the first stereo camera S1 will be referred to as a "first bit b1".

More specifically, the distance calculator 59 calculates the parallax between the front camera 13f and the first auxiliary camera 14a based on the image captured by the front camera 13f and the image captured by the first auxiliary camera 14a. The distance calculator 59 then calculates the distance from the front camera 13f and the first auxiliary camera 14a to the first bit b1 based on the parallax calculated in this manner and the internal and external parameters of the front camera 13f and the first auxiliary camera 14a.

Similarly, the distance calculator 59 according to this preferred embodiment calculates or measures the distance in the lateral direction as the predetermined direction using the second stereo camera S2. More specifically, as shown in FIG. 7, the distance calculator 59 allows calculation or measurement of the distance D2 from the back of the ship 101 (specifically, the position in which the second stereo camera S2 is located) to the subject that can be captured by the second stereo camera S2. In the example shown in FIG. 7, a bit b2 located on the quay Q is illustrated as the subject. As shown in the figure, the targets whose distances are to be measured may be different between the first and second stereo cameras S1 and S2. Hereinafter, the bit b2 as the subject of the second stereo camera S2 will be referred to as a "second bit b2".

More specifically, the distance calculator 59 calculates the parallax between the back camera 13b and the second auxiliary camera 14b based on the image captured by the back camera 13b and the image captured by the second auxiliary camera 14b. The distance calculator 59 then calculates the distance from the back camera 13b and the second auxiliary camera 14b to the second bit b2 based on the parallax calculated in this manner and the internal and external parameters of the back camera 13b and the second auxiliary camera 14b.

The distance calculator 59 outputs the distances D1 and D2 calculated as described above to the monitors 15 as the displays, and allows the monitors 15 to display the distances together with the bird's eye image 301. In the example shown in FIG. 8, the peripheral images of the ship 101, the quay Q, and the first and second bits b1 and b2 are displayed on the monitors 15 as the bird's eye image 301. In addition to the bird's eye image 301, the monitors 15 display the distance "XXXm" from the first stereo camera S1 to the first bit b1 and the distance "YYYm" from the second stereo camera S2 to the second bit b2. This display allows the assist for the ship operator's steering operation when mooring the ship 101 along the quay Q.

In this preferred embodiment described above, the imaging cameras 13f and 13b to create the composite image also define and function as the cameras for distance calculation or measurement as shown in FIG. 7, for example. This reduces the difference between the view obtained from the composite image and the actually measured distances.

Figure 8:
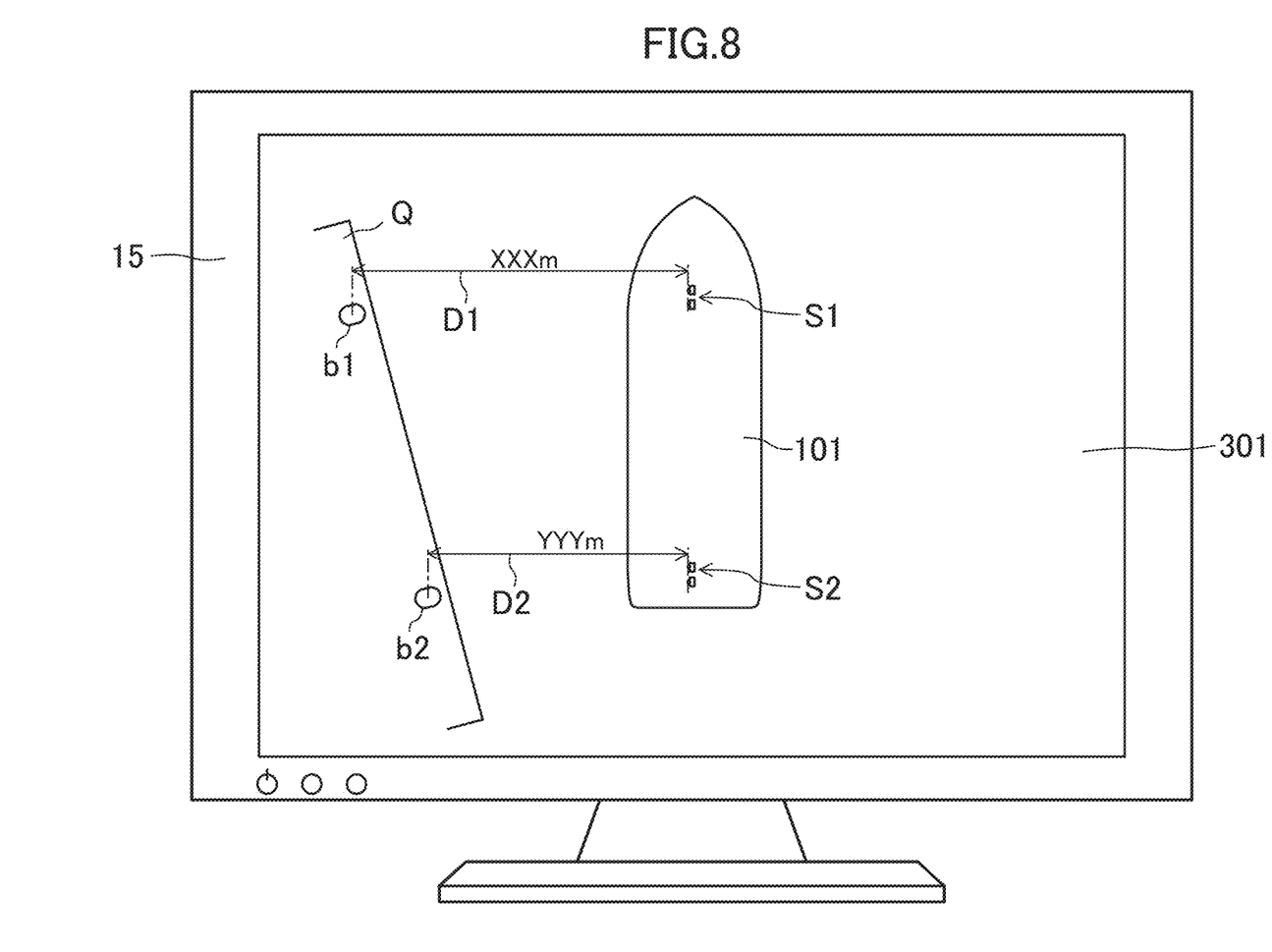
FIG. 8 is a schematic diagram showing an example of displaying a distance in accordance with the bird's eye image.

As shown in FIG. 8, the monitors 15 as the displays also display the measurement results obtained by the distance calculator 59 as the distance calculator in addition to the bird's eye image 301 as the composite image. This configuration is advantageous in assisting the steering operation.

As shown in FIG. 2, the first auxiliary camera 14a is located behind the front camera 13f, whereas the second auxiliary camera 14b is located in front of the back camera 13b. This configuration reduces the inclusion of the auxiliary cameras 14a and 14b in the bird's eye image 301 as the composite image.

As described above, the imaging cameras 13f and 13b, and the auxiliary cameras 14a and 14b are preferably wide-angle cameras each including the wide-angle lens 23. This allows measurement of the distances to the bits b1 and b2 without rotating the lenses using a mechanical mechanism.

Other Preferred Embodiments

In the preferred embodiments described above, the imaging device 11 of the ship 101 includes the four cameras, namely, the front camera 13f, the back camera 13b, the left camera 131, and the right camera 13r. The present disclosure is not limited to this configuration. The number of cameras included in the imaging device 11 of the ship 101 may be three or less or five or more. Any number of cameras may be included, as long as the composite image such as the bird's eye image 301 can be created.

In the preferred embodiments described above, the front camera 13f, the back camera 13b, the left camera 131, and the right camera 13r are hemisphere cameras. The present disclosure is not limited to this configuration. The hemispheric cameras are mere examples of cameras. Any type of camera may be included, as long as it is capable of capturing a relatively wide field of view. The same applies to the first and second auxiliary cameras 14a and 14b.

In the preferred embodiments described above, the first auxiliary camera 14a is adjacent to and behind the front camera 13f in the longitudinal direction. The present disclosure is not limited to this arrangement. For example, the front camera 13f and the first auxiliary camera 14a may be aligned in the lateral direction to measure the distance in the longitudinal direction of the ship 101.

Such a modification may also be made for the back camera 13b. Specifically, the back camera 13b and the second auxiliary camera 14b may be aligned in the lateral direction to measure the distance in the longitudinal direction of the ship 101.

As in the preferred embodiments described above, the auxiliary cameras may be aligned with some of the imaging cameras 13f, 13b, 131, and 13r. Alternatively, the auxiliary cameras may be aligned with all the imaging cameras 13f, 13b, 131, and 13r.

The wide-angle lenses 23 for the first and second auxiliary cameras 14a and 14b may have the same angle of view as the wide-angle lenses 23 for the imaging cameras 13f, 13b, 131, and 13r. Alternatively, the angles of view may be different.

In the preferred embodiments described above, the imaging device 11 creates the bird's eye image 301 as if the ship 101 were viewed down from above. The present disclosure is not limited to this configuration. The imaging device 11 may create, as a composite image, a panoramic image displaying the panoramic view around the ship 101.

Figure 9:
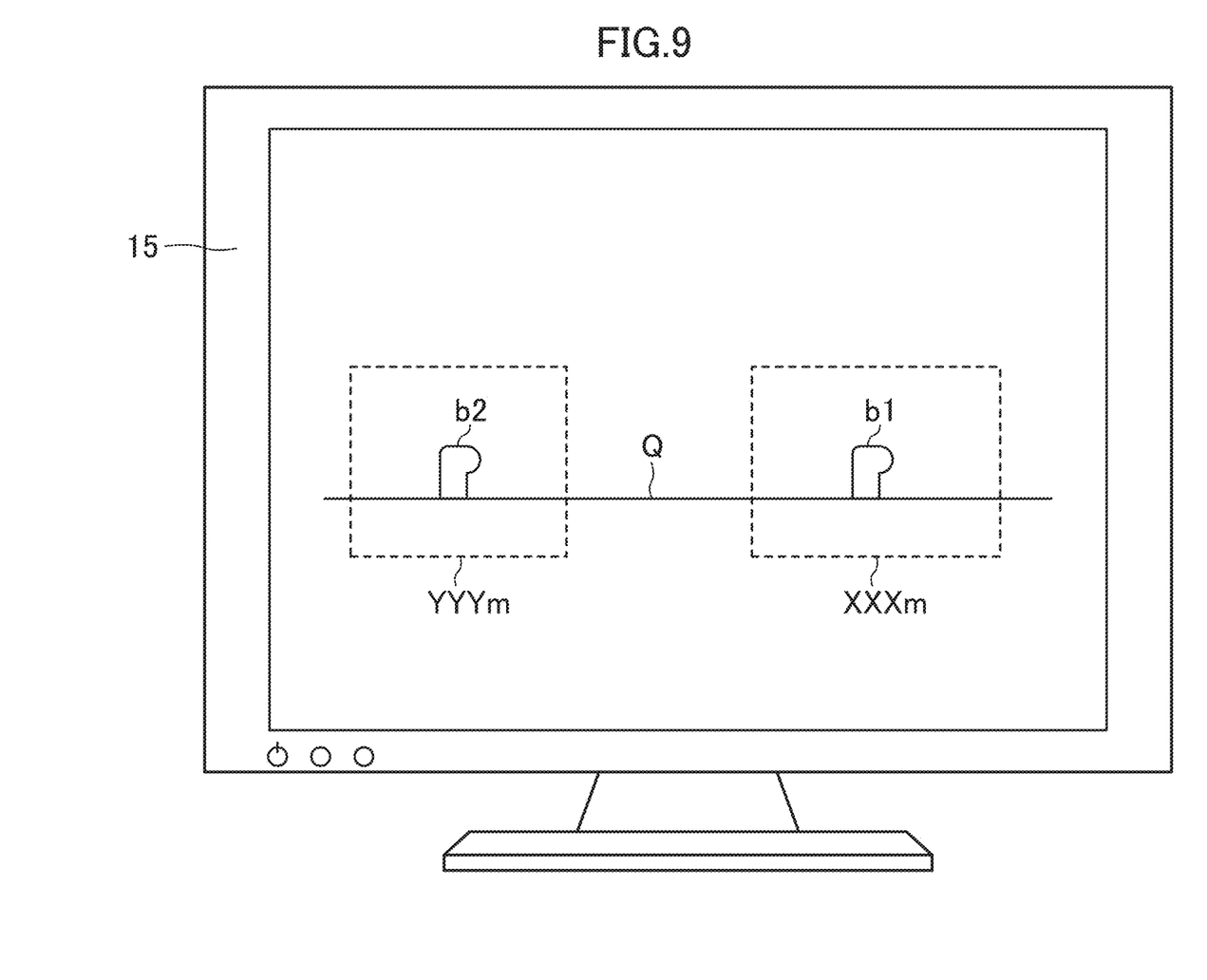
FIG. 9 is a schematic diagram showing another example of displaying a distance.

In the preferred embodiments described above, as shown in FIG. 8, the distances are displayed together with the bird's eye image 301. The present disclosure is not limited to this configuration. As illustrated in FIG. 9, the distance to the subject may overlap the image viewed from the side of the quay Q, the first bit b1, or the second bit b2, for example.

In the above preferred embodiments, as shown in FIG. 8, the distances to the bits b1 and b2 are measured. The present disclosure is not limited to this configuration. The target whose distance is to be measured may be, for example, a waste tire located on the wall of the quay Q or a fence standing on the quay Q.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An imaging device for a ship including a plurality of imaging cameras mounted on the ship that capture peripheral images of the ship and combines the peripheral images captured by the plurality of imaging cameras to create a composite image, the imaging device comprising:
    a first auxiliary camera adjacent to a front imaging camera of the plurality of imaging cameras in a longitudinal direction, the front imaging camera being located at a front of the ship, the front imaging camera and the first auxiliary camera are wide-angle cameras each including a wide-angle lens, wherein positioning the front imaging camera and the first auxiliary camera in the longitudinal direction creates an overlapping field of view of the wide-angle lens of the front imaging camera and the first auxiliary camera for distance calculation;
    a second auxiliary camera adjacent to a back imaging camera of the plurality of imaging cameras in the longitudinal direction, the back imaging camera being located at a back of the ship, the back imaging camera and the second auxiliary camera are wide-angle cameras each including a wide-angle lens, wherein positioning the back imaging camera and the second auxiliary camera in the longitudinal direction creates an overlapping field of view of the wide-angle lens of the back imaging camera and the second auxiliary camera for distance calculation; and
    a distance calculator to measure a first distance between the front of the ship and a first subject in a lateral direction using the front imaging camera and the first auxiliary camera, and measure a second distance between the back of the ship and a second subject in the lateral direction using the back imaging camera and the second auxiliary camera; wherein
    the front imaging camera and the first auxiliary camera are attached to a first structural body at the front of the ship with the front imaging camera closer to the first auxiliary camera than to a deck of the ship in a height direction such that the front imaging camera creates the composite image that reduces a difference between a view obtained from the composite image and the first measured distance;
    the back imaging camera and the second auxiliary camera are attached to a second structural body, different from the first structural body, at the back of the ship with the back imaging camera closer to the second auxiliary camera than to the deck of the ship in the height direction such that the back imaging camera creates the composite image that reduces a difference between the view obtained from the composite image and the second measured distance.

2. The imaging device of claim 1, further comprising: a display that displays the composite image and a measurement result obtained by the distance calculator.

3. The imaging device of claim 1, wherein the first auxiliary camera is located behind the front imaging camera; and the second auxiliary camera is located in front of the back imaging camera.

4. A ship comprising: the imaging device of claim 1.

5. An imaging device for a ship including a plurality of imaging cameras mounted on the ship that capture peripheral images of the ship and combines the peripheral images captured by the plurality of imaging cameras to create a composite image, the imaging device comprising:
    a first auxiliary camera adjacent to a front imaging camera of the plurality of imaging cameras in a longitudinal direction, the front imaging camera being located at a front of the ship, the front imaging camera and the first auxiliary camera are wide-angle cameras each including a wide-angle lens, wherein positioning the front imaging camera and the first auxiliary camera in the longitudinal direction creates an overlapping field of view of the wide-angle lens of the front imaging camera and the first auxiliary camera for distance calculation;
    a second auxiliary camera adjacent to a back imaging camera of the plurality of imaging cameras in the longitudinal direction, the back imaging camera being located at a back of the ship, the back imaging camera and the second auxiliary camera are wide-angle cameras each including a wide-angle lens, wherein positioning the back imaging camera and the second auxiliary camera in the longitudinal direction creates an overlapping field of view of the wide-angle lens of the back imaging camera and the second auxiliary camera for distance calculation; and
    a distance calculator to measure a first distance between the front of the ship and a first subject in a lateral direction using the front imaging camera and the first auxiliary camera, and measure a second distance between the back of the ship and a second subject in the lateral direction using the back imaging camera and the second auxiliary camera; wherein
    the front imaging camera and the first auxiliary camera are attached to a first structural body at the front of the ship with the front imaging camera closer to the first auxiliary camera than to a deck of the ship in a height direction such that the front imaging camera creates the composite image that reduces a difference between a view obtained from the composite image and the first measured distance;
    the back imaging camera and the second auxiliary camera are attached to a second structural body, different from the first structural body, at the back of the ship with the back imaging camera closer to the second auxiliary camera than to the deck of the ship in the height direction such that the back imaging camera creates the composite image that reduces a difference between the view obtained from the composite image and the second measured distance;
    the front imaging camera has a first optical axis extending along the longitudinal direction and directed toward a bow of the ship and away from the first auxiliary camera; and
    the back imaging camera has a second optical axis extending along the longitudinal direction and directed toward a stern of the ship and away from the second auxiliary camera.

6. The imaging device of claim 1, further comprising:
    a display that displays the composite image; wherein
    the display displays a bird's eye image as the composite image by combining a ship image displaying the ship, the first subject, and the second subject into one image.

* * * * *